United States Patent
Chen et al.

(10) Patent No.: US 8,550,414 B2
(45) Date of Patent: Oct. 8, 2013

(54) CHASSIS MODULE FOR FIXING ELECTRONIC DEVICES

(75) Inventors: Chuan-Feng Chen, Taipei (TW); Chin-Pang Hsu, Taipei (TW); Chin-Yueh Liu, Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 234 days.

(21) Appl. No.: 12/942,424

(22) Filed: Nov. 9, 2010

(65) Prior Publication Data

US 2012/0056055 A1    Mar. 8, 2012

(30) Foreign Application Priority Data

Sep. 6, 2010  (TW) .............................. 99217254 U

(51) Int. Cl.
 *G06F 1/16*  (2006.01)
(52) U.S. Cl.
 USPC .................. 248/276.1; 248/27.1; 361/679.33; 361/679.31
(58) Field of Classification Search
 USPC .................. 248/276.1, 220.21, 222.51, 27.1; 361/679.31, 679.33, 679.39; 312/223.2, 312/327
 See application file for complete search history.

(56) References Cited

U.S. PATENT DOCUMENTS

| 5,768,099 | A | * | 6/1998 | Radloff et al. | 361/679.31 |
| 5,938,157 | A | * | 8/1999 | Reiker | 248/200.1 |
| 6,721,177 | B1 | * | 4/2004 | Wang et al. | 361/679.33 |
| 6,775,132 | B2 | * | 8/2004 | Chen et al. | 361/679.33 |
| 6,956,737 | B2 | * | 10/2005 | Chen et al. | 361/679.39 |
| 7,092,249 | B2 | * | 8/2006 | Wang | 361/679.33 |
| 2005/0068720 | A1 | * | 3/2005 | Lambert et al. | 361/685 |
| 2012/0013233 | A1 | * | 1/2012 | Chen et al. | 312/327 |
| 2012/0056515 | A1 | * | 3/2012 | Chen et al. | 312/223.2 |
| 2012/0307443 | A1 | * | 12/2012 | Chen et al. | 361/679.31 |

\* cited by examiner

*Primary Examiner* — Anita M King
(74) *Attorney, Agent, or Firm* — Li & Cai Intellectual Property (USA) Office

(57) ABSTRACT

A chassis module for fixing electronic devices includes a fixing chassis unit and a first movable chassis unit. The fixing chassis unit has a fixing chassis body and a first fixing retaining structure disposed on a first lateral wall of the fixing chassis body. The first movable chassis unit is detachably disposed in the fixing chassis body. The first movable chassis unit has a first movable chassis body, a first movable retaining structure disposed on a first lateral wall of the first movable chassis body and mated with the first fixing retaining structure, and at least one support element bent downwardly and extended from one lateral wall of the first movable chassis body. Therefore, after the first movable chassis unit is assembled in the fixing chassis unit, the support element provides support function for the first movable chassis unit to prevent the first movable chassis unit from inclining or collapsing.

4 Claims, 16 Drawing Sheets

CHASSIS MODULE FOR FIXING ELECTRONIC DEVICES

BACKGROUND OF THE INVENTION

1. Field of the Invention

The instant disclosure relates to a chassis module, and more particularly, to a chassis module for fixing electronic devices.

2. Description of Related Art

An electronic apparatus, such as a computer, or a server, usually includes data storage devices, such as hard disk drives, compact disk read-only memory (CD-ROM) drives, digital video disc (DVD) drives, and floppy disk drives. These devices are typically added to increase the functionality of the electronic apparatus. However, installation of such devices in the electronic apparatus is usually labor-intensive.

The installation of a hard disk drive in a computer typically involves using screws to attach the hard disk drive to a bracket on a chassis of the computer. Usually, these screws are so small that it is difficult to install them. Guiding and mounting the screws into the intended location is not easy and may be time consuming. Additionally, because of their small size, the screws tend to drop before they are aligned at the intended location. This may cause damages to the circuitry of the computer.

To address the aforementioned problems, a plurality of mounting apparatuses has been invented to reduce the number of needed screws. For example, a pair of detachable rails is attached to opposite sides of a data storage device with screws. The data storage device is slid into, and secured to, a drive bracket. However, the screws have to be removed to detach the rails from the data storage device when replacing the data storage device.

In addition, the bracket of the prior art is a complete and inseparable iron frame for receiving the data storage devices such as optical disk drive and hard disk drive. However, because the bracket of the prior art is complete and inseparable and always has a large size, the cost is increased and it is inconvenient for the user to detach the bracket from the chassis.

Moreover, the lateral walls of the bracket of the prior art are mated with the chassis for positioning the bracket in the chassis, thus a central portion of the bracket is suspended in the chassis. Hence, when the data storage device is received in the bracket and the bracket is positioned in the chassis, the central portion of the bracket would be gradually caved due to the weight of the data storage device for a long time.

SUMMARY OF THE INVENTION

One particular aspect of the instant disclosure is to provide a chassis module for fixing electronic devices in order to solve the above-mentioned prior problems of using the complete, inseparable and large-size bracket without central support function.

To achieve the above-mentioned advantages, the instant disclosure provides a chassis module for fixing electronic devices, including: a fixing chassis unit and a first movable chassis unit. The fixing chassis unit has a fixing chassis body and a first fixing retaining structure disposed on a first lateral wall of the fixing chassis body. The first movable chassis unit is detachably disposed in the fixing chassis body. The first movable chassis unit has at least one first movable chassis body, a first movable retaining structure disposed on a first lateral wall of the at least one first movable chassis body and mated with the first fixing retaining structure, and at least one support element bent downwardly and extended from one lateral wall of the at least one first movable chassis body.

To achieve the above-mentioned advantages, the instant disclosure provides a chassis module for fixing electronic devices, including: a fixing chassis unit and a first movable chassis unit. The fixing chassis unit has a fixing chassis body, a first fixing retaining structure disposed on a first lateral wall of the fixing chassis body, and a second fixing retaining structure disposed on a second lateral wall of the fixing chassis body. The first movable chassis unit is detachably disposed in the fixing chassis body. The first movable chassis unit has at least one first movable chassis body, a first movable retaining structure disposed on a first lateral wall of the at least one first movable chassis body and mated with the first fixing retaining structure, a first crossing structure disposed on a second lateral wall of the at least one first movable chassis body, and at least one support element bent downwardly and extended from one lateral wall of the at least one first movable chassis body.

Therefore, after the first movable chassis unit is assembled in the fixing chassis unit, the support element can provides a support function for the first movable chassis unit to prevent the first movable chassis unit from inclining or collapsing.

To further understand the techniques, means and effects the instant disclosure takes for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention that they be used for limiting the instant disclosure.

DETAILED DESCRIPTION OF THE PREFERRED EMBODIMENTS

Referring to FIGS. 1A to 3B, the first embodiment of the instant disclosure provides a chassis module for fixing electronic devices, including: a fixing chassis unit 1 and a first movable chassis unit 2.

Figure 1A:
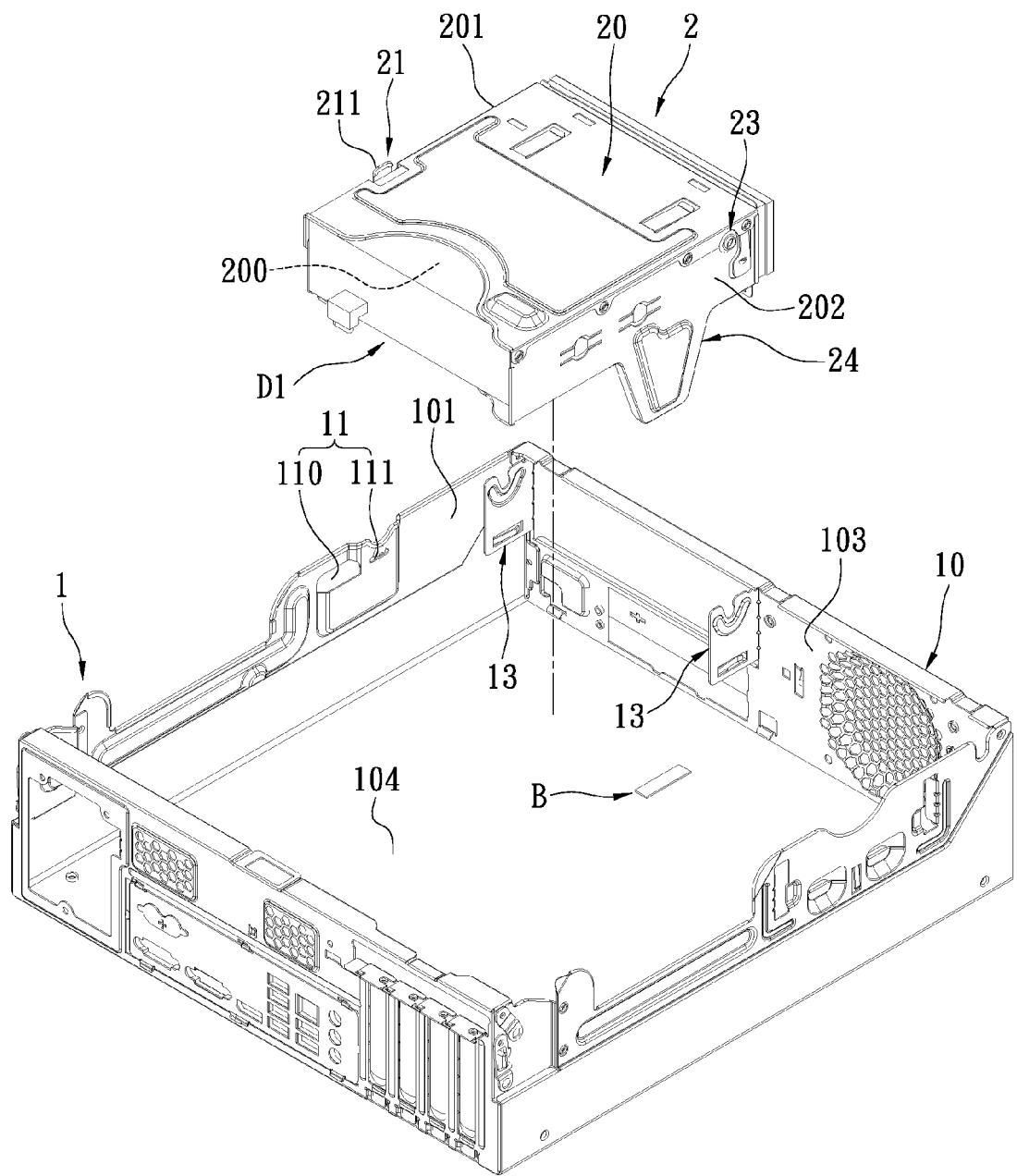
FIG. 1A shows one perspective, exploded, schematic view of the chassis module (before assembling the first movable chassis unit in the fixing chassis unit) according to the first embodiment of the instant disclosure.
Figure 1B:
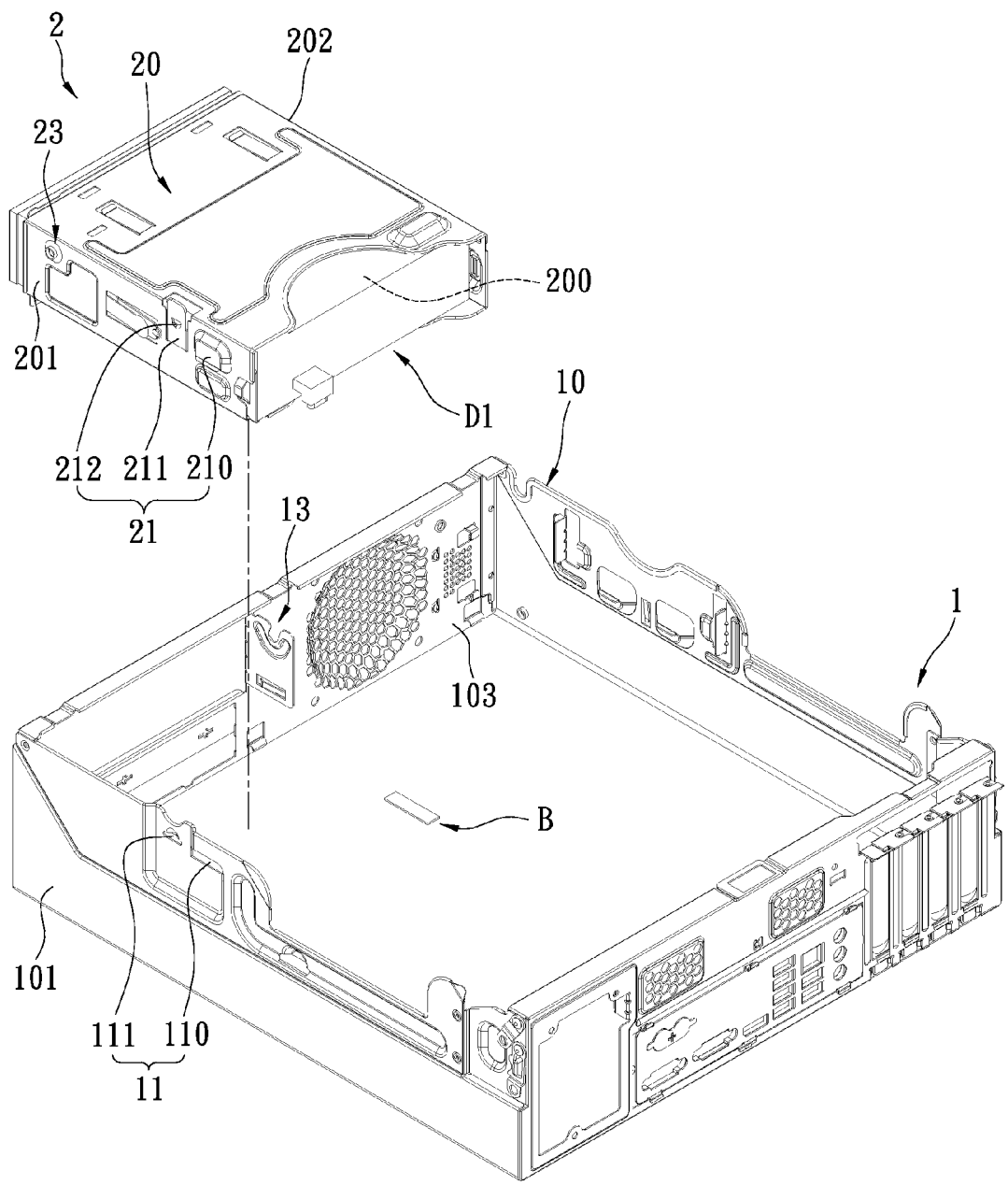
FIG. 1B shows another perspective, exploded, schematic view of the chassis module (before assembling the first movable chassis unit in the fixing chassis unit) according to the first embodiment of the instant disclosure.

Referring to FIGS. 1A and 1B, the fixing chassis unit 1 has a fixing chassis body 10 and a first fixing retaining structure 11 disposed on a first lateral wall 101 of the fixing chassis body 10. In addition, the fixing chassis body 10 may be a computer casing for receiving and fixing data storage devices (such as optical disk drive, hard disk drive etc.) or a machine caning for any purpose.

For example, the fixing chassis unit 1 has at least two first pivot portions 13 bent inwardly and extended from a third lateral wall 103 of the fixing chassis body 10, it means the two first pivot portions 13 can be integrated with and extended from the third lateral wall 103 of the fixing chassis body 10. In addition, the first lateral wall 101 is neighbor to the third lateral wall 103.

Referring to FIGS. 1A and 1B, the first movable chassis unit 2 has at least one first movable chassis body 20 and a first movable retaining structure 21 disposed on a first lateral wall 201 of the first movable chassis body 20 and mated with the first fixing retaining structure 11. In addition, the first movable chassis body 20 has a first receiving portion 200 formed therein for receiving a first electronic device such as an optical disk drive D1.

For example, the first movable chassis unit 2 has at least two second pivot portions 23 respectively formed on two opposite lateral walls (such as the first lateral wall 201 and the second lateral wall 202) of the first movable chassis body 20 and respectively mated with the two first pivot portions 13. In addition, each first pivot portion 13 has a pivot groove or a pivot post, and each second pivot portion 23 has a pivot post received in the pivot groove of each first pivot portion 13 or a pivot groove for receiving the pivot post of each first pivot portion 13. In the first embodiment of the instant disclosure, each first pivot portion 13 has a pivot groove and each second pivot portion 23 has a pivot post received in the pivot groove of each first pivot portion 13.

Figure 2:
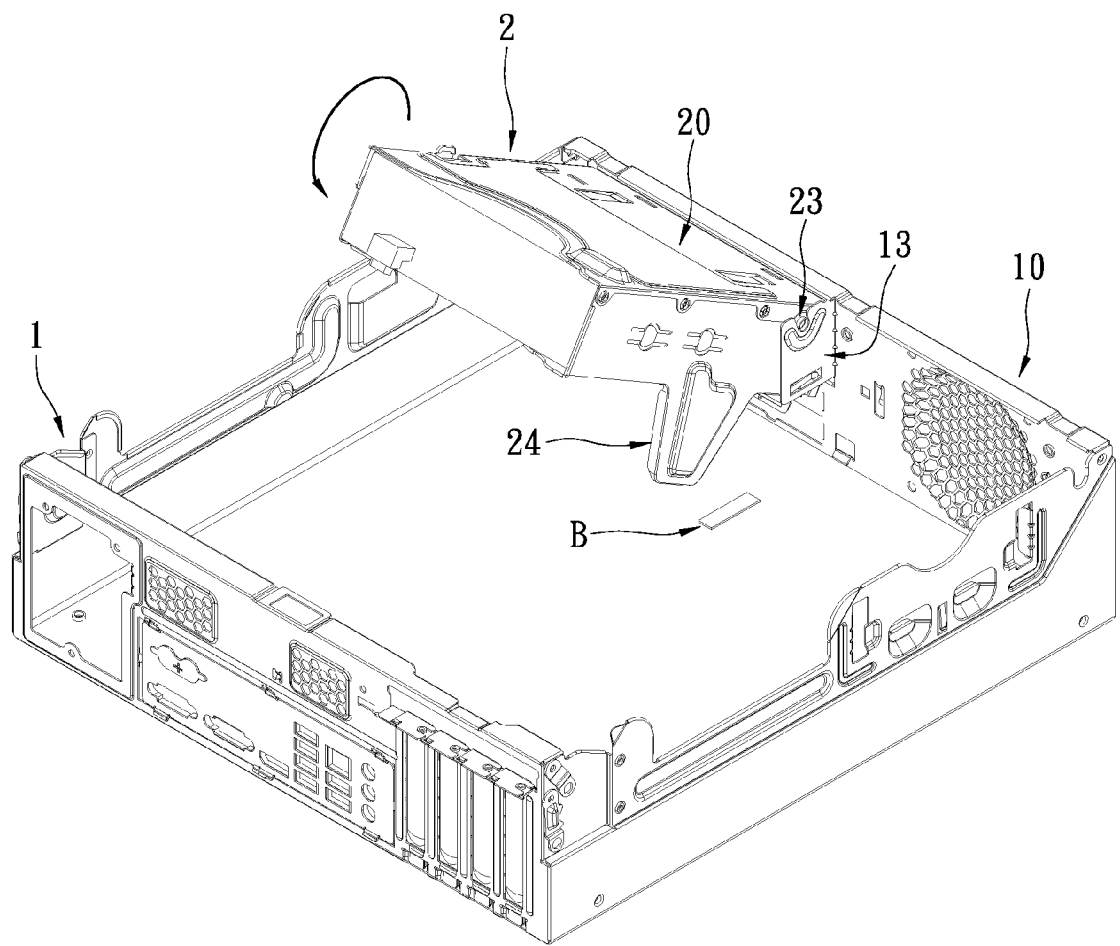
FIG. 2 shows a perspective, exploded, schematic view of the chassis module (after assembling one part of the first movable chassis unit in the fixing chassis unit) according to the first embodiment of the instant disclosure.

Therefore, the fixing chassis unit 1 and the first movable chassis unit 2 can be movably connected to each other by matching the two first pivot portions 13 and the second pivot portions 23 (as shown in FIG. 2, of course, the two first pivot portions 13 and the second pivot portions 23 can be replaced by retaining structures). Because the fixing chassis unit 1 and the first movable chassis unit 2 can be movably connected to each other, thus the fixing chassis unit 1 can be rotated relative to the two first pivot portions 13 (shown as the arrow in FIG. 2). For example, each first pivot portion 13 may be an arc-shaped opening and each second pivot portion 23 may be a cylinder, thus each second pivot portion 23 can freely contact each first pivot portion 13 and does not be locked or limited by the each first pivot portion 13. Because the two pivot portions 13 can be used as an axle center, the fixing chassis unit 1 can be rotated freely in a predetermined limit region that is defined by the position of the third lateral wall 103 and the position of the first fixing retaining structure 11.

Figure 3A:
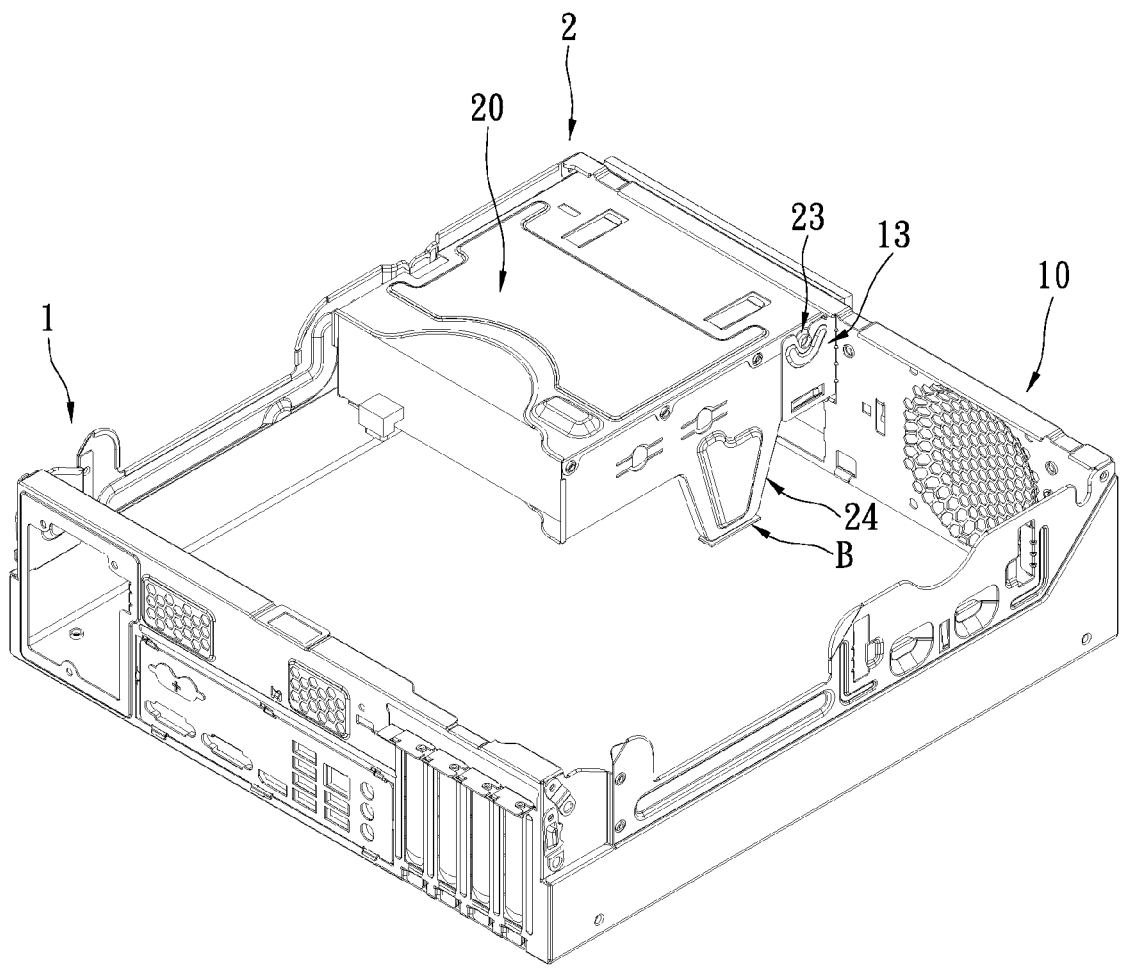
FIG. 3A shows one perspective, exploded, schematic view of the chassis module (after assembling the first movable chassis unit in the fixing chassis unit and before assembling the second movable chassis unit in the fixing chassis unit) according to the first embodiment of the instant disclosure.
Figure 3B:
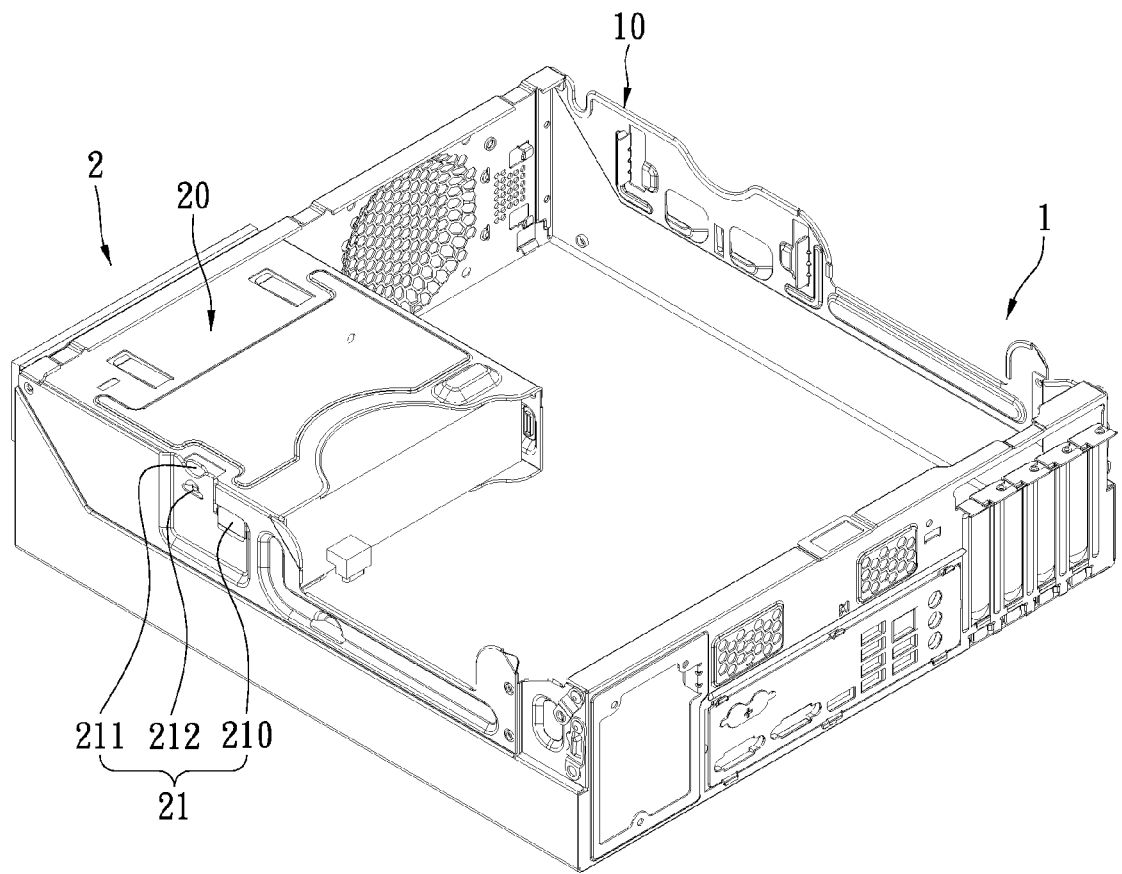
FIG. 3B shows another perspective, exploded, schematic view of the chassis module (after assembling the first movable chassis unit in the fixing chassis unit and before assembling the second movable chassis unit in the fixing chassis unit) according to the first embodiment of the instant disclosure.

When the first movable chassis unit 2 is rotated from a position close to the third lateral wall 103 toward the first fixing retaining structure 11 and is rotated to the end (as shown in FIGS. 3A and 3B), the first movable retaining structure 21 and the first fixing retaining structure 11 are mated with each other. At this time, the first movable chassis unit 2 is approximately parallel to the inner surface 104 of the fixing chassis unit 1, the first crossing structure 22 of the first movable chassis unit 2 is approximately parallel to the first fixing retaining structure 11.

For example, the first fixing retaining structure 11 has at least one positioning hole 110 and at least one first protrusion portion 111 (as shown in FIGS. 1A and 1B, and the first protrusion portion 111 can also be a retaining hole with any shape). The first movable retaining structure 21 has at least one positioning element 210 inserted into the positioning hole 110, at least one first elastic piece 211 selectively moved to close to or far from the first protrusion portion 111, and at least one first retaining element 212 disposed on the first elastic piece 211 and selectively inserted into or separated from the first protrusion portion 111.

Therefore, when the first movable chassis unit 2 is rotated and rotated to the end relative to the two first pivot portions 13 (as shown in FIGS. 3A and 3B), the positioning element 210 can be smoothly inserted into the positioning hole 110 for positioning the position of the first movable chassis body 20 relative to the fixing chassis body 10. At the same time, the first elastic piece 211 is pushed to close to the first protrusion portion 111 by its stored elastic force, thus the first retaining element 212 can be smoothly inserted into the first protrusion portion 111 for positioning the first movably chassis body 20 in the fixing chassis body 10.

When the user wants to take the first movable chassis body 20 out from the fixing chassis body 10, the user can lightly touch (pushing action) a top portion of the first elastic piece 211 toward the first movable chassis body 20 for separating the first retaining element 212 from the first protrusion portion 111, thus it is easy for the user to take the first movable chassis body 20 out from the fixing chassis body 10 by lightly touching the first elastic piece 211. Hence, the first movable chassis unit 2 can be detachably disposed in the fixing chassis body 10 according to different requirements. In other words, the user can assemble the first movable chassis unit 2 in the fixing chassis body 10 or detach the first movable chassis unit 2 from the fixing chassis body 10 easily without using any securing tool.

Referring to FIGS. 1A, 2 and 3A, the first movable chassis unit 2 has at least one support element 24 bent downwardly and extended from one lateral wall (such as the second lateral wall 202) of the first movable chassis body 20. In other words, the support element 24 can be integrally extended from one lateral wall of the first movable chassis body 20. In the first embodiment of the instant disclosure, a raw support element is one part of the bottom portion of the first movable chassis body 20, and the raw support element can be bent outwardly from the bottom portion of the first movable chassis body 20 and be approximately parallel to the second lateral wall 202 to form the support element 24.

In addition, the support element 24 can selectively contact the inner surface 104 of the fixing chassis body 10 or contact a cushion B on the inner surface 104 of the fixing chassis body 10. In the first embodiment of the instant disclosure, the support element 24 contacts the cushion B on the inner surface 104 of the fixing chassis body 10. Therefore, after the first movable chassis unit 2 is assembled in the fixing chassis unit 1, the support element 24 can provides a support function for the first movable chassis unit 2 to prevent the first movable chassis unit 2 from inclining or collapsing.

Referring to FIGS. 4A to 8C, the second embodiment of the instant disclosure provides a chassis module for fixing electronic devices, including: a fixing chassis unit 1, a first movable chassis unit 2 and a second movable chassis unit 3. For example, the fixing chassis unit 1 and the first movable chassis unit 2 can be made of metal material such as iron, and the second movable chassis unit 3 can be made of plastic material to reduce cost.

Figure 4A:
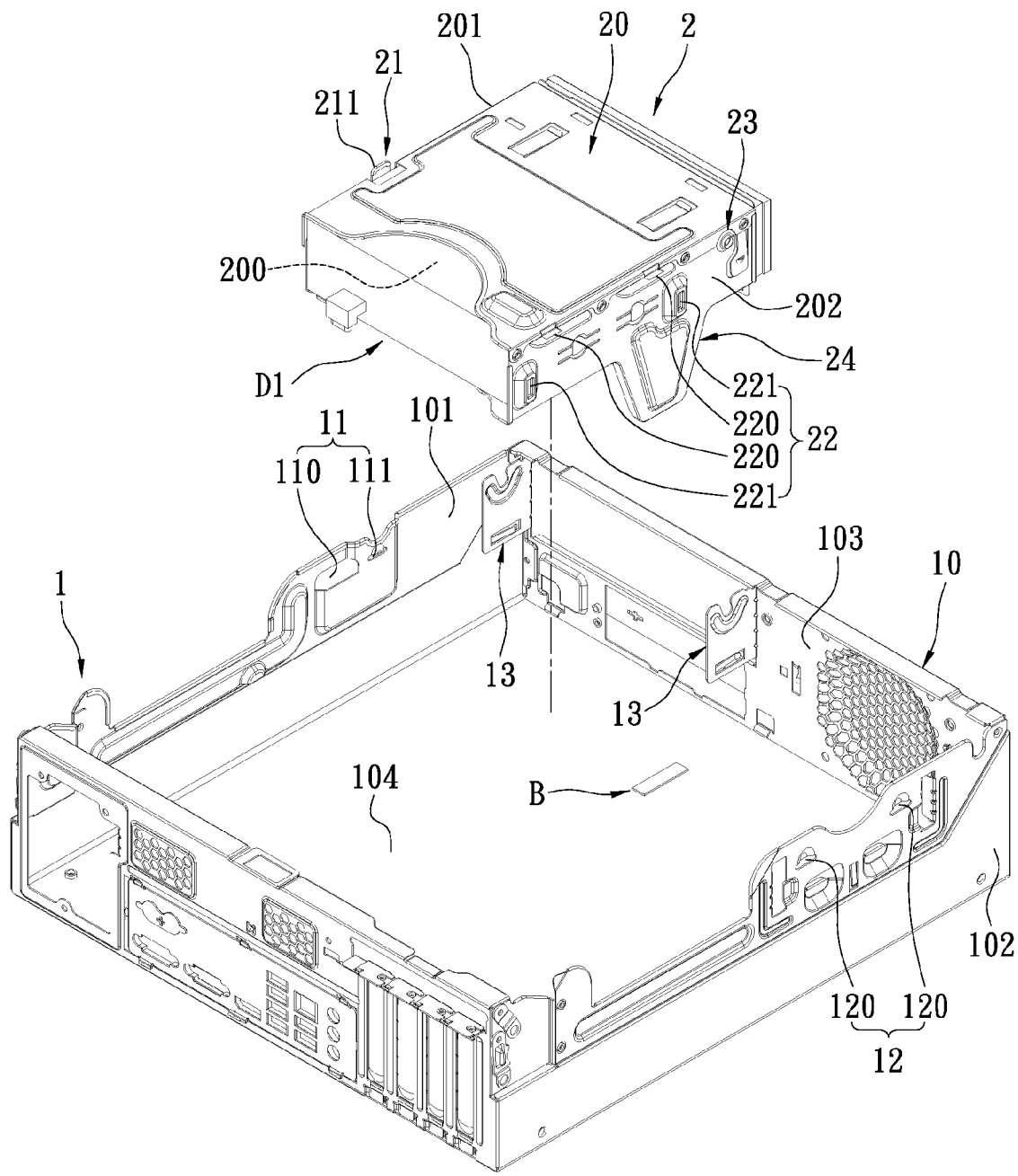
FIG. 4A shows one perspective, exploded, schematic view of the chassis module (before assembling the first movable chassis unit in the fixing chassis unit) according to the second embodiment of the instant disclosure.
Figure 4B:
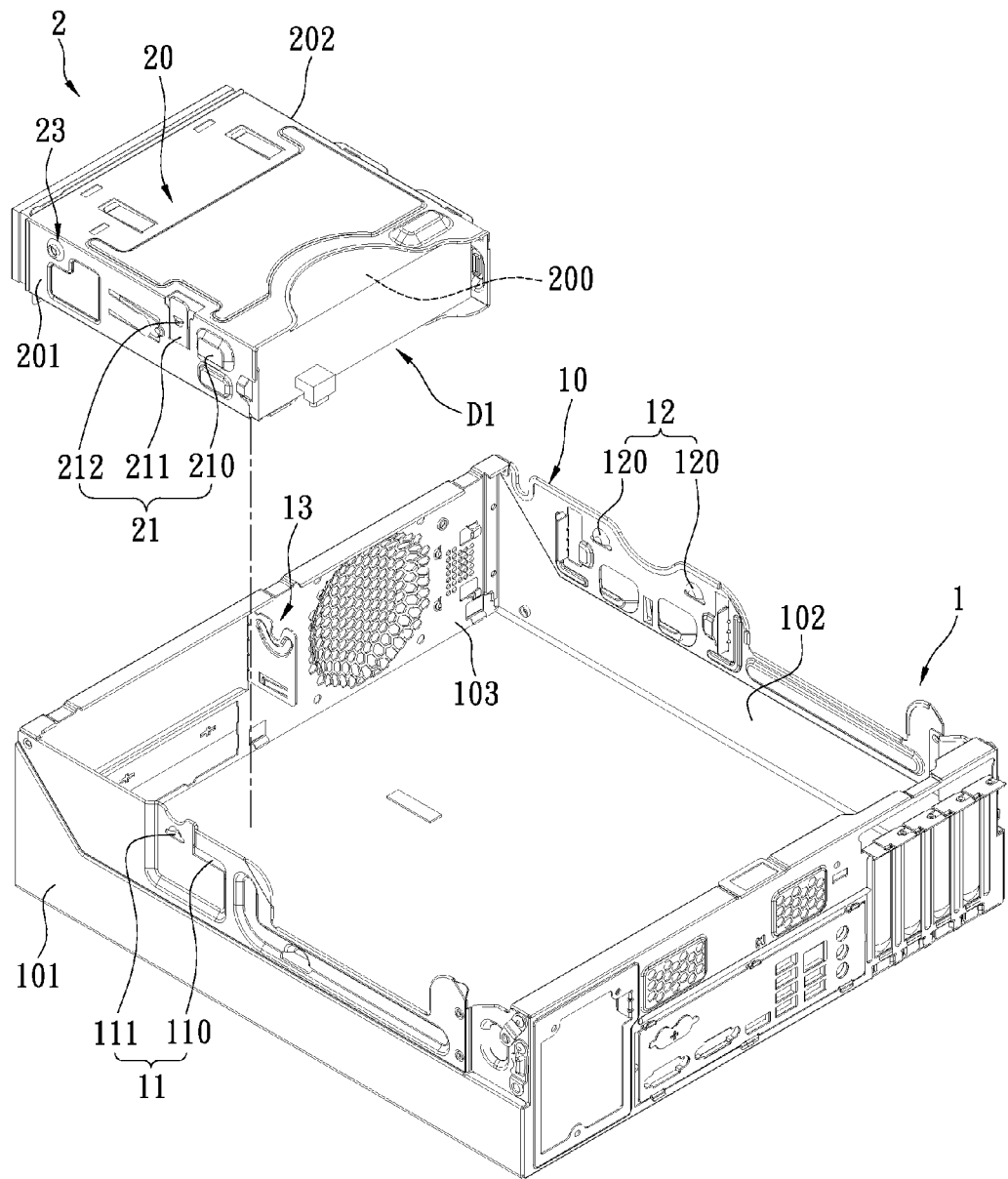
FIG. 4B shows another perspective, exploded, schematic view of the chassis module (before assembling the first movable chassis unit in the fixing chassis unit) according to the second embodiment of the instant disclosure.

Referring to FIGS. 4A and 4B, the difference between the second embodiment and the first embodiment is that: in the second embodiment, the fixing chassis unit 1 has a second fixing retaining structure 12 disposed on a second lateral wall 102 of the fixing chassis body 10. In addition, the first lateral wall 101 and the second lateral wall 102 are respectively disposed on two opposite lateral sides of the fixing chassis body 10, and the third lateral wall 103 is connected between one end of the first lateral wall 101 and one end of the second lateral wall 102 of the fixing chassis body 10.

Referring to FIGS. 4A and 4B, the difference between the second embodiment and the first embodiment is that: in the second embodiment, the first movable chassis unit 2 has a first crossing structure 22 disposed on a second lateral wall 202 of the first movable chassis body 20, and the first lateral wall 201 and the second lateral wall 202 are respectively disposed on two opposite lateral sides of the first movable chassis body 20.

Figure 6A:
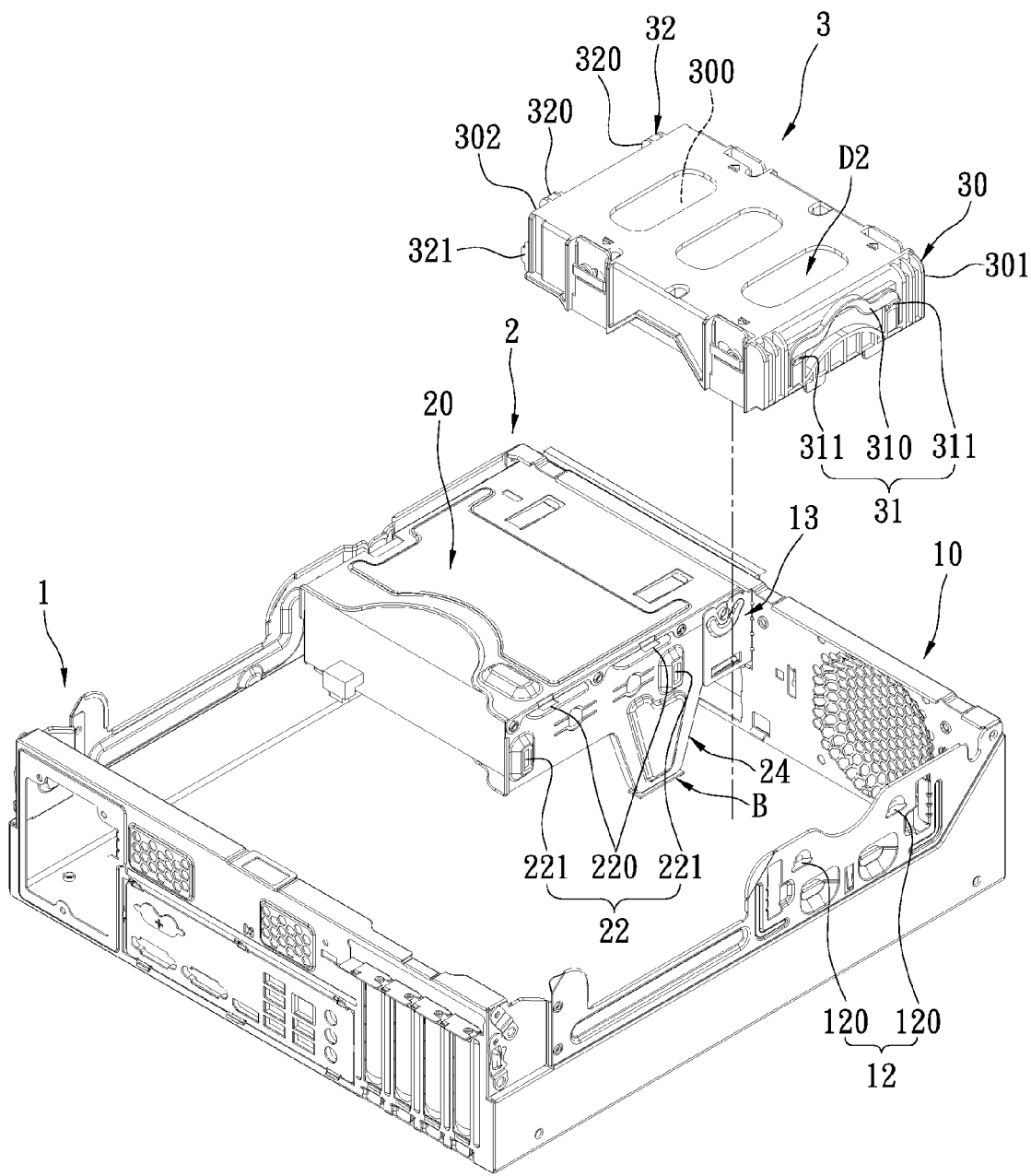
FIG. 6A shows one perspective, exploded, schematic view of the chassis module (after assembling the first movable chassis unit in the fixing chassis unit and before assembling the second movable chassis unit in the fixing chassis unit) according to the second embodiment of the instant disclosure.
Figure 6B:
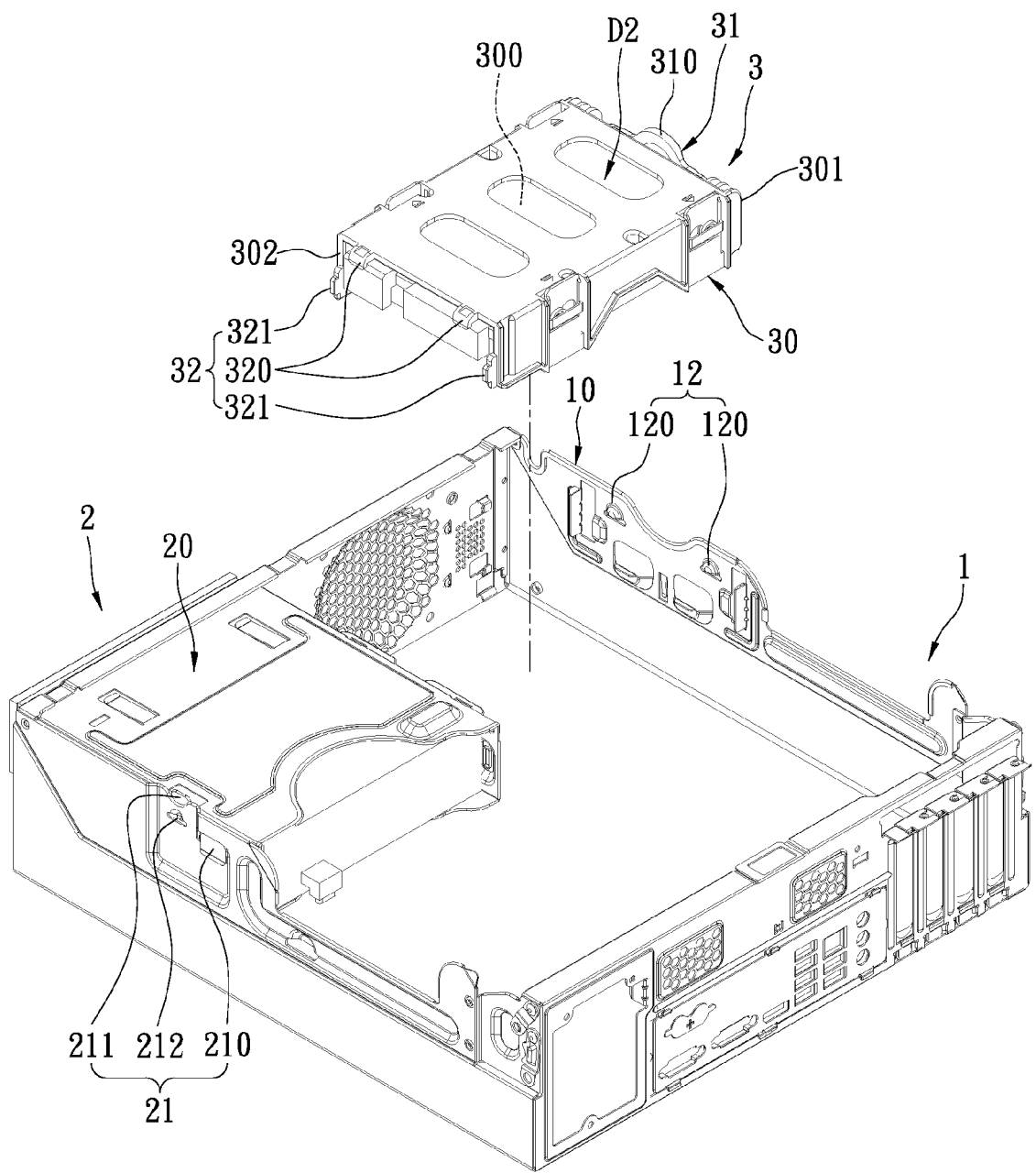
FIG. 6B shows another perspective, exploded, schematic view of the chassis module (after assembling the first movable chassis unit in the fixing chassis unit and before assembling the second movable chassis unit in the fixing chassis unit) according to the second embodiment of the instant disclosure.

When the first movable chassis unit 2 is rotated from a position close to the third lateral wall 103 toward the first fixing retaining structure 11 and is rotated to the end (as shown in FIGS. 6A and 6B), the first movable retaining structure 21 and the first fixing retaining structure 11 are mated with each other. At this time, the first movable chassis unit 2 is approximately parallel to the inner surface 104 of the fixing chassis unit 1, the first crossing structure 22 of the first movable chassis unit 2 is approximately parallel to the first fixing retaining structure 11, and the first crossing structure 22 is also approximately parallel to the second fixing retaining structure 12 that is disposed on the second lateral wall 102 of the fixing chassis body 10.

Figure 5:
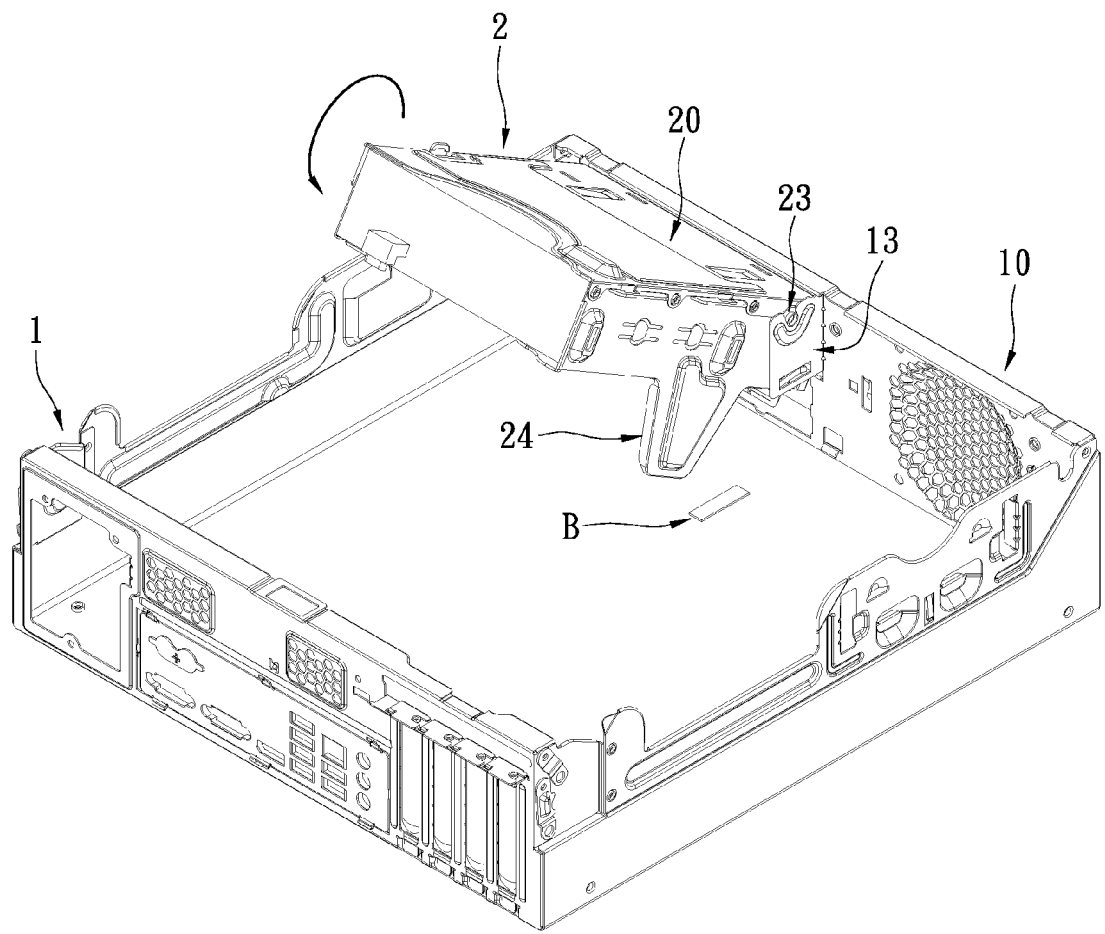
FIG. 5 shows a perspective, exploded, schematic view of the chassis module (after assembling one part of the first movable chassis unit in the fixing chassis unit) according to the second embodiment of the instant disclosure.

Referring to FIGS. 4A, 5 and 6A, the first movable chassis unit 2 has at least one support element 24 bent downwardly and extended from one lateral wall (such as the second lateral wall 202) of the first movable chassis body 20. The function of the support element 24 of the second embodiment is the same as the first embodiment. Referring to FIGS. 6A and 6B, the second movable chassis unit 3 has at least one second movable chassis body 30, a second movable retaining structure 31 disposed on a first lateral wall 301 of the second movable chassis body 30 and mated with the second fixing retaining structure 12, and a second crossing structure 32 disposed on a second lateral wall 302 of the second movable chassis body 30 and mated with the first crossing structure 22. The first lateral wall 301 and the second lateral wall 302 of the second movable chassis body 30 are respectively disposed on two opposite lateral sides of the second movable chassis body 30, and the second movable chassis body 30 has a second receiving portion 300 formed therein for receiving a second electronic device such as a hard disk drive D2.

For example, the first crossing structure 22 has at least one hooking hole 220 and at least one inserting hole 221, and the second crossing structure 32 has at least one hooking element 320 hooked in the hooking hole 220 and at least one inserting element 321 inserted into the inserting hole 221, and the size of the hooking element 320 corresponds to the size of the hooking hole 220. In addition, the second fixing retaining structure 12 has at least one second protrusion portion 120 (the second protrusion portion 120 can also be a retaining hole with any shape), and the second movable retaining structure 31 has at least one second elastic piece 310 selectively moved to close to or far from the second protrusion portion 120 and at least one second retaining element 311 disposed on the second elastic piece 310 and selectively inserted into or separated from the second protrusion portion 120.

Referring to FIGS. 6A and 6B, in the second embodiment of the instant disclosure, the first crossing structure 22 has two hooking holes 220 and two inserting holes 221, the second crossing structure 32 has two hooking elements 320 and two inserting element 321, and each hooking element 320 has an arc-shaped surface. In addition, the second fixing retaining structure 12 has two second protrusion portions 120, and the second movable retaining structure 31 has two second elastic pieces 310 and two second retaining elements 311.

Figure 7A:
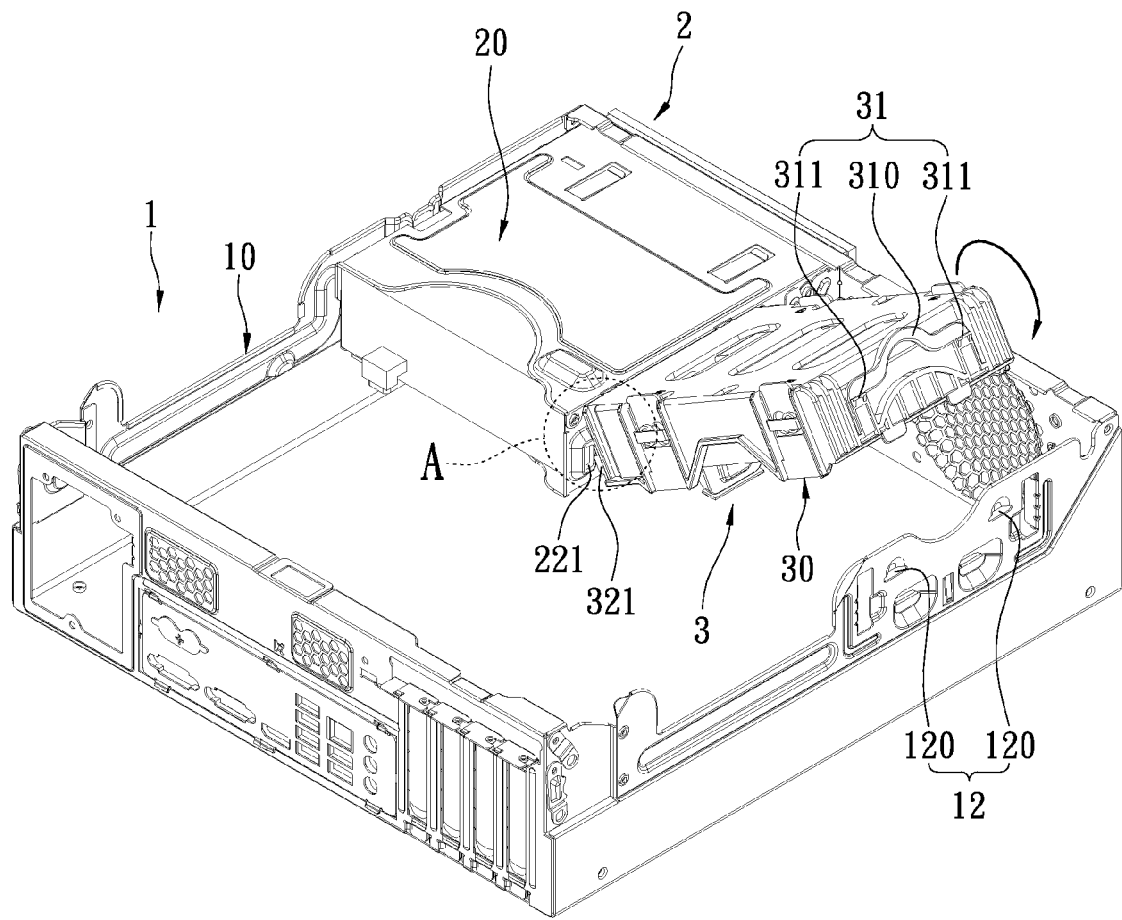
FIG. 7A shows a perspective, exploded, schematic view of the chassis module (after assembling the first movable chassis unit and one part of the second movable chassis unit in the fixing chassis unit) according to the second embodiment of the instant disclosure.
Figure 7B:
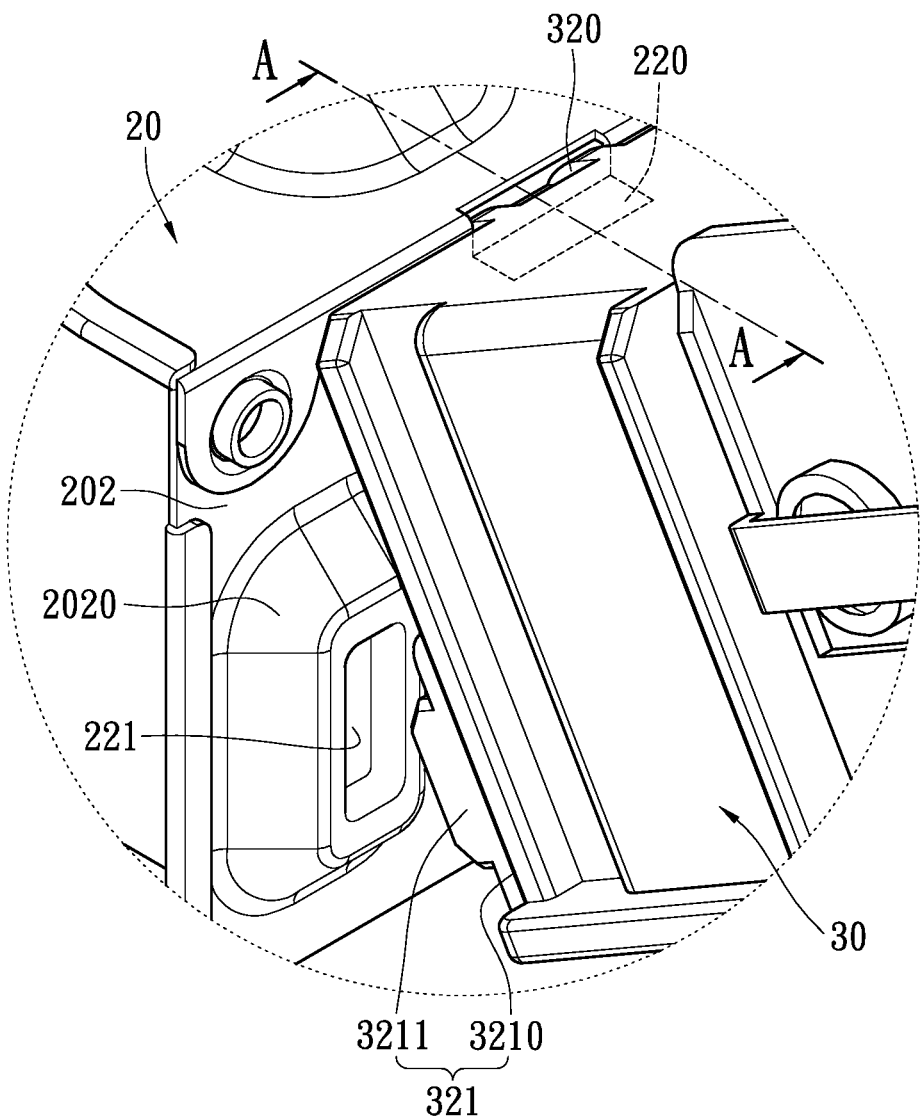
FIG. 7B is an enlarged view of A part of FIG. 7A.
Figure 7C:
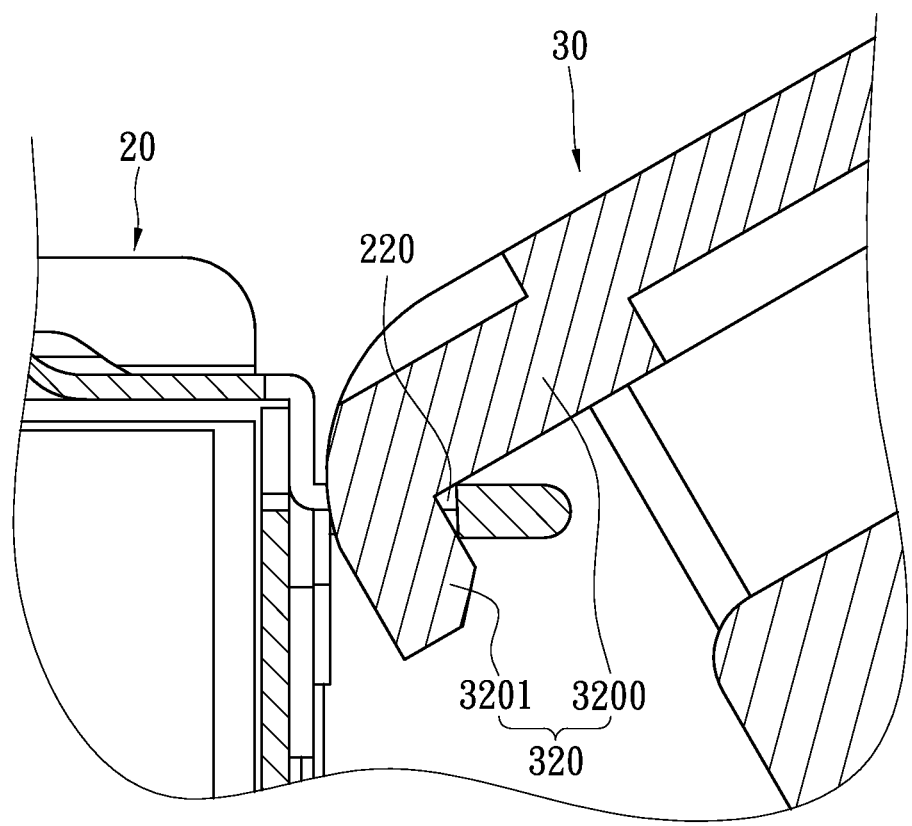
FIG. 7C is a cross-sectional view along line A-A shown in FIG. 7A.

Referring to FIGS. 6A and 7A-7C, the two hooking elements 320 of the second movable chassis body 30 are respectively hooked into the two hooking holes 220 of the first crossing structure 22 firstly (as shown in FIGS. 7B and 7C), and then the second movable chassis body 30 can be rotated and pressed to the end relative to the two hooking holes 220 (shown as the arrow in FIG. 7A). In addition, each hooking element 320 has an extending portion 3200 extended outwardly from the second movable chassis body 30 and a bending portion 3201 bent downwardly from the extending portion 3200 and passing through each hooking hole 220, and the size of each bending portion 3201 corresponds to each hooking hole 220. The bending portion 3201 of each hooking element 320 has an arc-shaped surface selectively contacting an inner surface of each hooking hole 220. Because the arc-shaped surface of each bending portion 3201 contacts the inner surface of each hooking hole 220, thus each hooking element 320 can smoothly and conveniently pass through each hooking hole 220 (as shown in FIG. 7C). Moreover, one part of the size of each inserting element 321 corresponds to the size of each inserting hole 221. Each inserting element 321 has a stopping portion 3210 extended outwardly from the second movable chassis body 30 and an inserting portion 3211 extended outwardly from the stopping portion 3210 and inserted into each inserting hole 221 (as shown in FIG. 7B). The first movable chassis body 20 has two convex portions 2020 extended outwardly from the second lateral wall 202 thereof, and each convex portion 2020 as shown in FIG. 7B is formed around each inserting hole 221. The inserting portion 3211 of each inserting element 321 is received inside each convex portion 2020 to prevent the optical disk drive D1 from being interferedly contacted by the inserting portion 3211 of each inserting element 321.

Furthermore, the first movable chassis body 20 and the second movable chassis body 30 can be separated from each other by a predetermined gap due to the design of the convex portions 2020. In other words, the second lateral wall 202 of the first movable chassis body 20 does not completely contact the second lateral wall 302 of the second movable chassis body 30, thus the heat-dissipating efficiency of the first movable chassis body 20 and the second movable chassis body 30 is increased. For example, wind generated by a system fan (not shown) installed in the fixing chassis body 10 can pass through the gap between the first movable chassis body 20 and the second movable chassis body 30 to increase the heat-dissipating efficiency for the first movable chassis body 20 and the second movable chassis body 30.

Figure 8A:
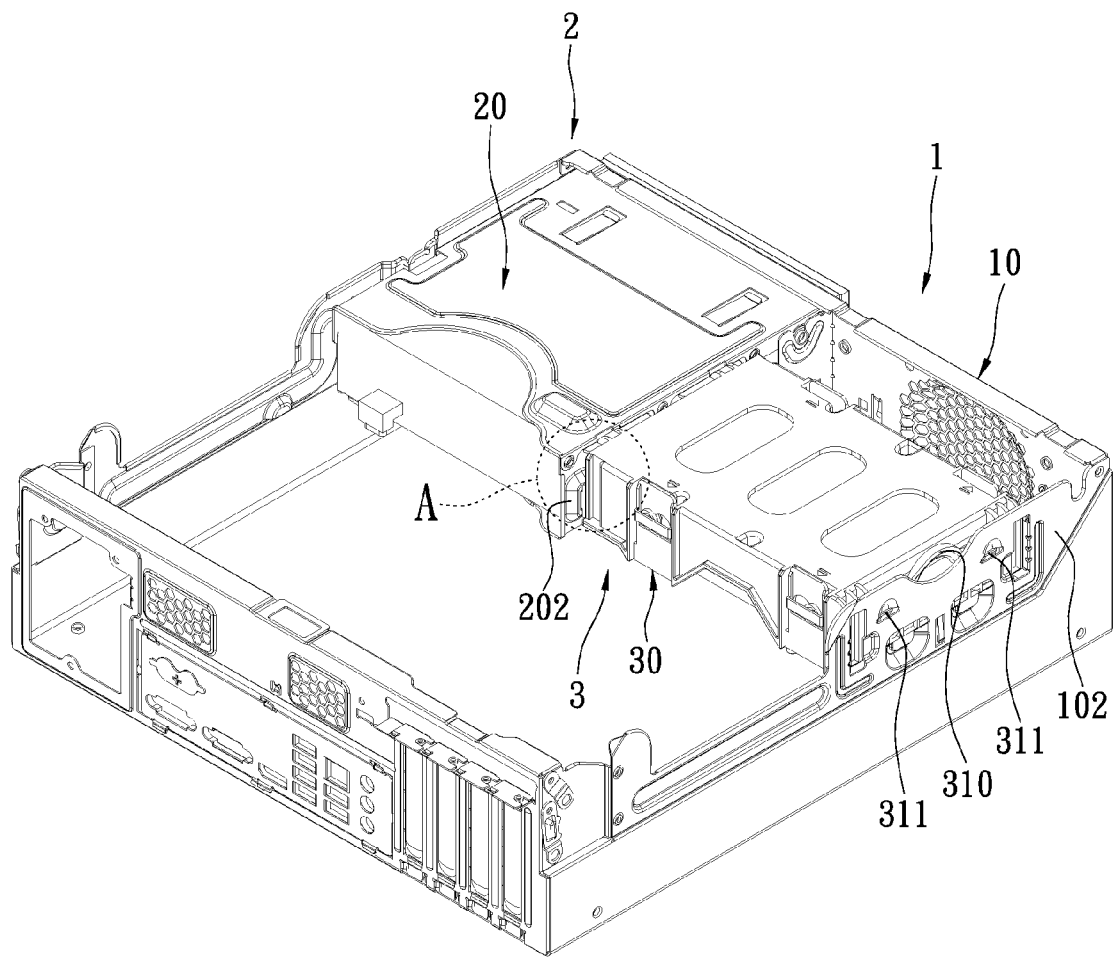
FIG. 8A shows a perspective, exploded, schematic view of the chassis module (after assembling the first movable chassis unit and the second movable chassis unit in the fixing chassis unit) according to the second embodiment of the instant disclosure.
Figure 8B:
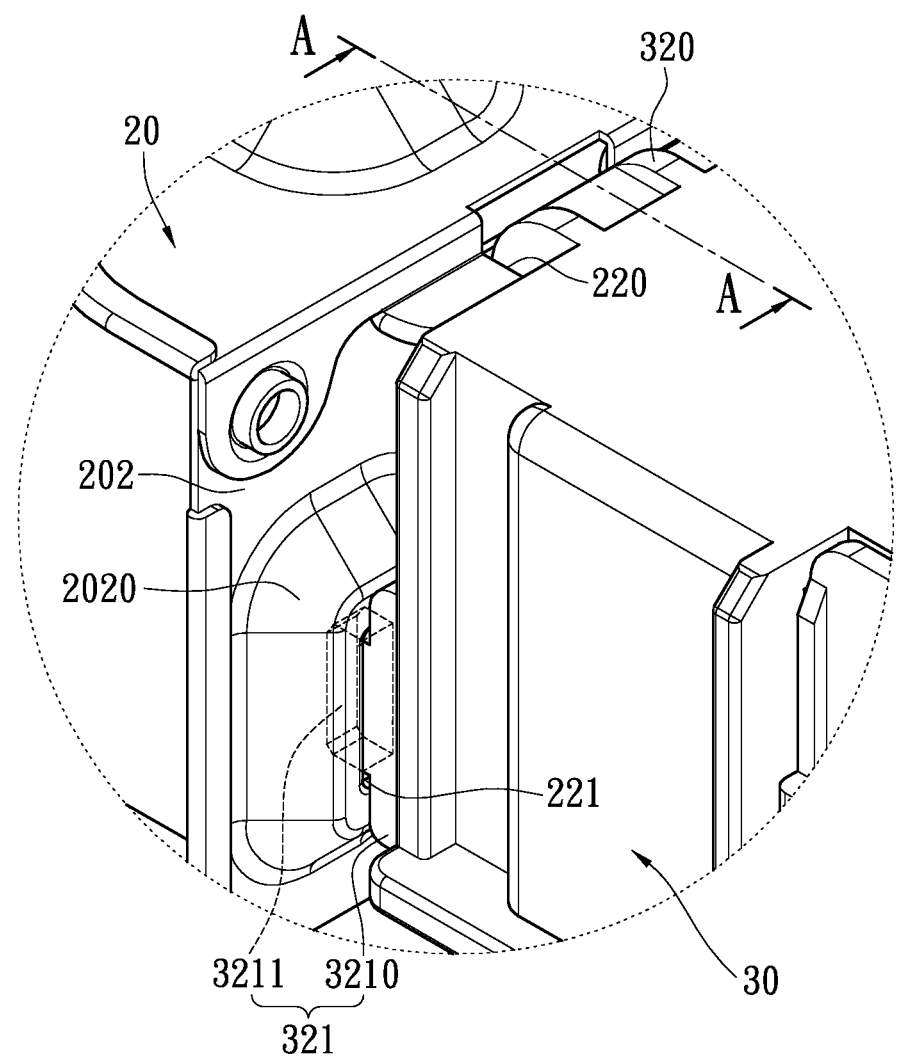
FIG. 8B is an enlarged view of A part of FIG. 8A.
Figure 8C:
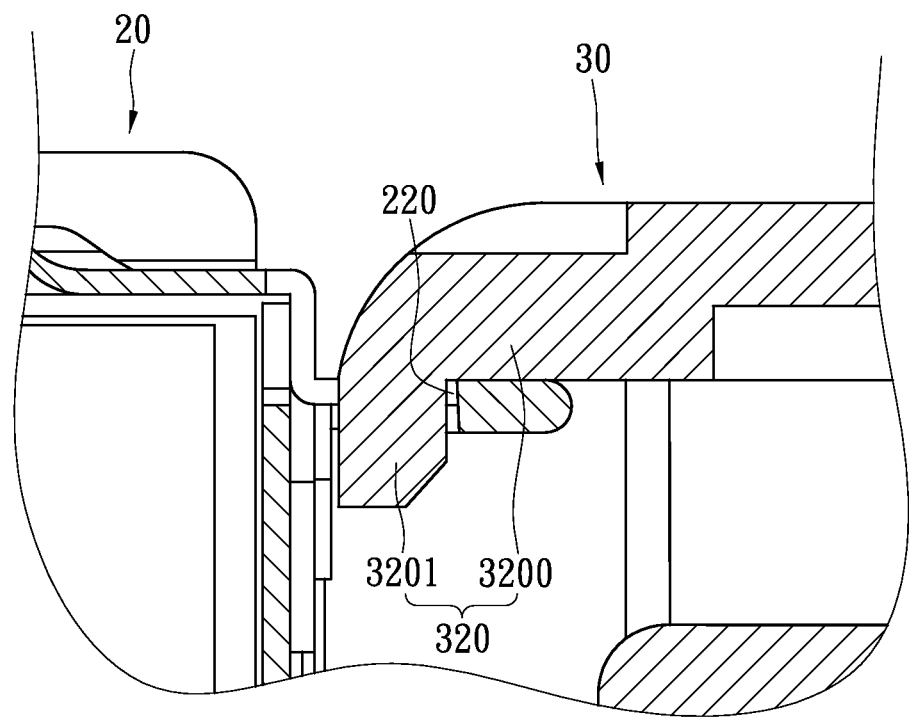
FIG. 8C is a cross-sectional view along line A-A shown in FIG. 8A.

Referring to FIGS. 8A to 8C, when the second movable chassis body 30 is pressed downwardly and rotated to the end, the two inserting elements 321 of the second crossing structure 32 are respectively and smoothly inserted into the two inserting holes 221 of the first crossing structure 22 (as shown in FIG. 8B). At the same time, the second elastic piece 310 is pushed to close to the two second protrusion portion 120 by its stored elastic force, thus the two second retaining element 311 can be respectively and smoothly inserted into the two second protrusion portion 120 for positioning the second movably chassis body 30 in the fixing chassis body 10 (as shown in FIG. 8A).

In other words, first, the bending portion 3201 of each hooking element 320 of the second movable chassis body 30 can be hooked into each hooking hole 220 of the first crossing structure 22, and then the second movable chassis body 30 can be pressed downwardly and rotated to the end relative to the two hooking holes 220, thus the inserting portion 3211 of each inserting element 321 can be smoothly inserted into each inserting hole 221 of the first crossing structure 22 and be surroundingly covered by each convex portion 2020. At the same time, the stopping portion 3210 of each inserting element 321 can be obstructed out of the each convex portion 2020.

According to the above-mentioned assembly method, the second movable chassis body 30 can be assembled in the fixing chassis body 10, and the second movable chassis body 30 can also be positioned between the second lateral wall 202 of the first movable chassis body 20 and the second lateral wall 102 of the fixing chassis body 10 (as shown in FIG. 8A).

In addition, the second movable chassis body 30 fixed in the fixing chassis body 10 can be approximately parallel to the inner surface 104 of the fixing chassis body 10 and approximately parallel to the first movable chassis unit 2 due to the designs of the first crossing structure 22 and the second fixing retaining structure 12. Moreover, the positions of the first fixing retaining structure 11, the first crossing structure 22 and the second fixing retaining structure 12, the first fixing retaining structure 11 need to be design carefully for prevent the heights of the first movable chassis unit 2 or the second movable chassis unit 3 from being protruded over the top fringes of the first lateral wall 101, the second lateral wall 102 and the third lateral wall 103. Hence, when a cover (not shown) covers an opening of the fixing chassis unit 1 (the opening is surrounded by the first lateral wall 101, the second lateral wall 102 and the third lateral wall 103), the bottom side of the cover can not touch the first movable chassis unit 2 and the second movable chassis unit 3.

Furthermore, when the user wants to take the second movable chassis body 30 out from the fixing chassis body 10, the user can lightly touch (pushing action) a top portion of the second elastic piece 310 toward the second movable chassis body 30 for respectively separating the two second retaining elements 311 from the two second protrusion portions 120, thus it is easy for the user to take the second movable chassis body 30 out from the fixing chassis body 10 by lightly touching the second elastic piece 310. Hence, the second movable chassis unit 3 can be detachably disposed in the fixing chassis body 10 according to different requirements. In other words, the user can assemble the second movable chassis unit 3 in the fixing chassis body 10 or detach the second movable chassis unit 3 from the fixing chassis body 10 easily without using any securing tool.

In conclusion, one lateral wall of the first movable chassis body 20 and one lateral wall of the fixing chassis body 10 can be retainedly mated with each other, one lateral wall of the second movable chassis body 30 and another later wall of the first movable chassis body 20 can be retainedly mated with each other, and another lateral wall of the second movable chassis body 30 and another lateral wall of the fixing chassis body 10 can be retainedly mated with each other. In other words, one lateral wall of the first movable chassis body 20 and one lateral wall of the second movable chassis body 30 are respectively retainedly mated with the two opposite lateral walls of the fixing chassis body 10, and another lateral wall of the first movable chassis body 20 and another lateral wall of the second movable chassis body 30 are crossly and retainedly mated with each other. Hence, the first movable chassis unit 2 and the second movable chassis unit 3 can be assembled in or detached from the fixing chassis unit 1 easily according to the above-mentioned simple structure design.

In other words, because the first movable retaining structure 21 can be selectively mated with the first fixing retaining structure 11 and the second movable retaining structure 31 can be selectively mated with the second fixing retaining structure 12, the first movable chassis unit 2 and the second movable chassis unit 3 can be assembled in the fixing chassis unit 1 easily. In addition, the first movable chassis unit 2 and the second movable chassis unit 3 can also be detached from the fixing chassis unit 1 easily by the above-mentioned pushing action. Furthermore, after the first movable chassis unit 2 is assembled in the fixing chassis unit 1, the support element 24 can provides a support function for the first movable chassis unit 2 to prevent the first movable chassis unit 2 from inclining or collapsing.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A chassis module for fixing electronic devices, comprising:
    a fixing chassis unit having a fixing chassis body and a first fixing retaining structure disposed on a first lateral wall of the fixing chassis body; and
    a first movable chassis unit detachably disposed in the fixing chassis body, wherein the first movable chassis unit has at least one first movable chassis body, a first movable retaining structure disposed on a first lateral wall of the at least one first movable chassis body and mated with the first fixing retaining structure, and at least one support element bent downwardly and extended from one lateral wall of the at least one first movable chassis body;

wherein the fixing chassis unit has at least two first pivot portions bent inwardly and extended from a third lateral wall of the fixing chassis body, the first movable chassis unit has at least two second pivot portions respectively mated with the at least two first pivot portions, and the third lateral wall is connected between the first lateral wall and the second lateral wall.

2. The chassis module of claim 1, wherein each first pivot portion has a pivot groove or a pivot post, and each second pivot portion has a pivot post received in the pivot groove of each first pivot portion or a pivot groove for receiving the pivot post of each first pivot portion.

3. The chassis module of claim 1, wherein the first fixing retaining structure has at least one positioning hole and at least one first protrusion portion, and the first movable retaining structure has at least one positioning element inserted into the at least one positioning hole, at least one first elastic piece selectively moved to close to or far from the at least one first protrusion portion, and at least one first retaining element disposed on the at least one first elastic piece and selectively inserted into or separated from the at least one first protrusion portion.

4. The chassis module of claim 1, wherein the at least one support element selectively contacts an inner surface of the fixing chassis body or contacts a cushion that is disposed on the inner surface of the fixing chassis body.

\* \* \* \* \*